H. LENTZ.
VALVE MECHANISM FOR HYDRAULIC TRANSMISSION.
APPLICATION FILED NOV. 25, 1910.
1,107,675.
Patented Aug. 18, 1914.
2 SHEETS—SHEET 1.
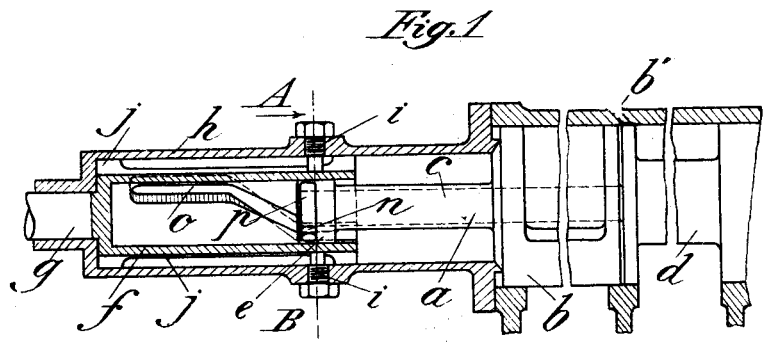
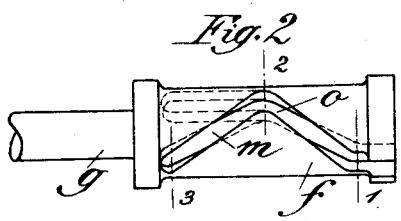
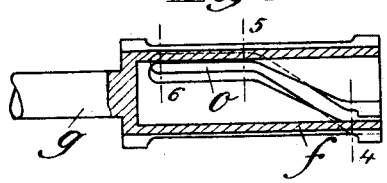
WITNESSES
Alfred R Anderson
F. H. Logan
INVENTOR
HUGO LENTZ
By H. Van Deusen
ATTORNEY H. LENTZ.
VALVE MECHANISM FOR HYDRAULIC TRANSMISSION.
APPLICATION FILED NOV. 25, 1910.
1,107,675.
Patented Aug. 18, 1914.
2 SHEETS—SHEET 2.
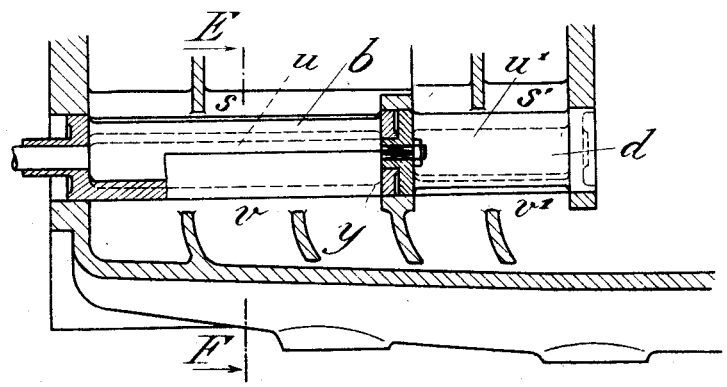
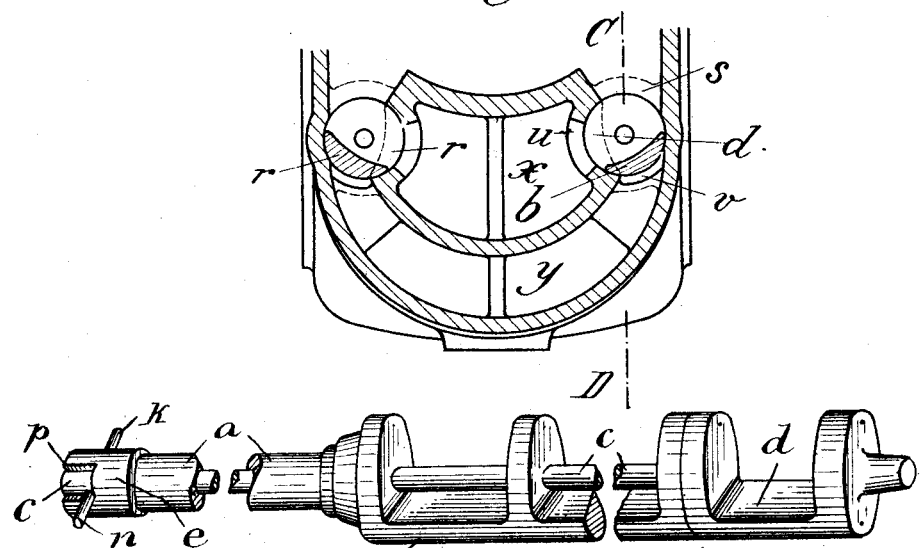

UNITED STATES PATENT OFFICE.

HUGO LENTZ, OF BERLIN-GRUNEWALD, GERMANY.

VALVE MECHANISM FOR HYDRAULIC TRANSMISSION.

1,107,675.   Specification of Letters Patent.   Patented Aug. 18, 1914.

Application filed November 25, 1910. Serial No. 594,192.

*To all whom it may concern:*

Be it known that I, HUGO LENTZ, engineer, subject of the German Emperor, and residing at Berlin-Grunewald, Germany, have invented a new and useful Valve Mechanism for Hydraulic Transmission; and I do hereby declare the following to be a full, clear, and exact description of the same.

The subject-matter of my invention is a device for actuating valves in hydraulic variable speed gear, by means of which the valves which are arranged one in another are actuated by one single rod.

My invention substantially consists in providing the valves with rods which are not only mounted one in another but each has a projection running in a guide way in a sleeve, so that owing to the axial movement of the latter a rotatory motion is imparted both to the rods and to the valves.

One illustrative embodiment of my invention is represented by way of example in the accompanying drawing, wherein:—

Figure 1 is an elevation, partly in section, showing my improved device, Fig. 2 shows the actuating sleeve in elevation and Fig. 3 the same part in longitudinal section; Figs. 4 to 6 are sections taken on the line A—B in Fig. 1 showing the parts in various positions. Fig. 7 is a longitudinal vertical section taken on the line C D of Fig. 8 and showing the valves partly in section and partly in elevation in the same position which they assume in Fig. 8, and Fig. 8 is a transverse vertical section on the line E F of Fig. 7, through one of the valves shown in Fig. 7, the other valve shown in Fig. 7 being shown in dotted lines in Fig. 8. Fig. 9 is a perspective view of the valves.

Referring to Figs. 1 to 6 of the drawing, the rod $a$ of the valve $b$ is hollow and the rod $c$ of the second valve $d$ is mounted within the same. Both the rods are guided through the medium of a collar $e$ fast on the left-hand end of the rod $a$ in a sleeve $f$ which is provided with a rod $g$ and is slidable longitudinally within a cylinder $h$ attached to the valve casing $b'$. The guide pins $i$ provided in the cylinder $h$ and engaging in longitudinal grooves $j$ cut in the sleeve $f$ insure this sleeve being moved rectilinearly in its axial direction.

A projection or pin $k$ which is fast on the left-hand end of the outer hollow rod $a$ (Figs. 4 to 6) and engages in the guide-way $o$ (Fig. 2) which comprises the two parts 1—2 and 2—3 at an angle relatively to one another in the sleeve $f$. The inner rod $c$ also has a projection or pin $n$ guided in the sleeve $f$ in another guide-way $m$ (Fig. 3) which comprises the two parts 4—5 and 5—6, of which the former runs parallel to the part 1—2 of the former guide-way and the latter parallel with the axis of the sleeve.

The collar $e$ of the outer hollow rod $a$ is provided with a recess $p$ (Figs. 4 to 6) which insures that the pin $n$ of the inner rod $c$ has the requisite free movement.

The arrangement of the valves to be operated is shown in Figs. 7 and 8. These valves comprise the valves $b$ and $d$ shown in Fig. 7 and in Fig. 8 to the right. The valve $r$ shown at the left of Fig. 8 is as long as the two slide valves $b$ and $d$ together and serves to reverse the gear. The fully drawn position of the valve $r$ in Fig. 8 corresponds to the forward travel, and the position indicated in dotted lines to the backward travel. The pumps of the gear may be arranged above the pair of valves $b$, $d$, and are adapted to drive the liquid through the openings $s$ or $s'$ to the valve $b$ or $d$ respectively and thence through openings $v$ or $v'$ to the pressure chamber $y$ and thence to the motor (not shown) at the end of the chamber $y$ beyond the valve $d$. From the suction chamber the liquid may pass through the valve $r$ to the pumps. It will be seen that by shifting the valves to the positions of the solid or dotted lines various combinations of connections can be made. Such of these shifts as have proved desirable in practice have been provided for by the mechanism hereinbefore described and explained.

My improved device operates as follows:—In the position shown in Fig. 1 the pins $n$ and $k$ are held at the points 1 and 4 of the corresponding guides $m$ and $o$, respectively. This position corresponds with that shown in Figs. 4, 7 and 8, and it can be so arranged for example, that the valve $d$ now opens the opening $v'$ and the valve $b$ closes the opening $v$. Now when the sleeve $f$ is moved to the right, in consequence of the slanting parts of the grooves 1—2 and 4—5 the two pins $n$ and $k$ are turned upwardly until they occupy the positions shown in Fig. 5. The two valve rods $a$ and $c$ are rotated relatively to one another, this position corresponding to the valve $d$ having covered the opening $v'$ and the valve $b$ having uncovered the opening $v$. Now when the sleeve $f$ is moved still farther to the right, the lowering portion 2—3 of the groove $m$ so coacts with the pin $n$ that the latter is returned into its initial position, while the portion 5—6 of the guide-way $o$ leaves the pin $k$ in its last position, so that the position of the parts shown in Fig. 6 consequently corresponds with both valves having uncovered the openings $v'$ and $v$.

My device has the following advantages:—Firstly, both valves $b$ and $d$ can be actuated by means of one single movement, secondly, the device is perfectly protected from injury, and, thirdly, the valve rods are mutually, and therefore certainly guided.

Obviously the guide-ways may be so arranged that both the valves are simultaneously held in their closed position. Also, the slanting parts of the guide-ways may be interrupted by parallel parts in order to obtain any desired intermediate positions of the valves.

The arrangement is just as suitable when there are more than two rods mounted one within another.

I claim:—

1. The combination, with a plurality of valves, of concentric rods movable relatively one to another attached thereto, and a guided sleeve surrounding the ends of said rods and having a plurality of guide-ways, each rod having a member engaging in one of the guide-ways.

2. The combination of a hollow revoluble valve-rod having a valve attached to one end thereof, a second valve-rod revoluble in the former valve-rod, a valve attached to one end of the second valve-rod, a guided sleeve provided with two angular guide-ways surrounding the other ends of said valve-rods, the former valve-rod carrying a pin projecting into one of said guide-ways and a pin on the second valve-rod projecting into the other guide-way, substantially as shown.

In testimony whereof, I have signed my name to this specification in the presence of two subscribing witnesses.

HUGO LENTZ.

Witnesses:
JAKOB KRAUS,
LUDWIG PEILERT.